(12) United States Patent
Erkes et al.

(10) Patent No.: US 10,952,448 B2
(45) Date of Patent: Mar. 23, 2021

(54) REDUCTION OF THE CONCENTRATION OF GRAM-NEGATIVE BACTERIA IN A FERMENTED FOOD PRODUCT BY THE COMBINATION OF RED WINE EXTRACT AND A CULTURE COMPRISING AT LEAST ONE BACTERIOCIN-PRODUCING LACTIC ACID BACTERIAL STRAIN

(71) Applicant: Chr. Hansen A/S, Hoersholm (DK)

(72) Inventors: Michael Erkes, Lotte (DE); Tim Martin Seibert, Marburg (DE)

(73) Assignee: CHR. HANSEN A/S, Hoersholm (DK)

( * ) Notice: Subject to any disclaimer, the term of this patent is extended or adjusted under 35 U.S.C. 154(b) by 129 days.

(21) Appl. No.: 15/549,978

(22) PCT Filed: Feb. 11, 2016

(86) PCT No.: PCT/EP2016/052899
§ 371 (c)(1),
(2) Date: Aug. 9, 2017

(87) PCT Pub. No.: WO2016/128508
PCT Pub. Date: Aug. 18, 2016

(65) Prior Publication Data
US 2019/0029279 A1 Jan. 31, 2019

(30) Foreign Application Priority Data
Feb. 11, 2015 (EP) .................................... 15154620

(51) Int. Cl.
| | |
|---|---|
| A23B 4/22 | (2006.01) |
| A23L 3/3463 | (2006.01) |
| A23L 3/3472 | (2006.01) |
| A23L 3/3571 | (2006.01) |
| A23B 4/20 | (2006.01) |

(52) U.S. Cl.
CPC .................. *A23B 4/22* (2013.01); *A23B 4/20* (2013.01); *A23L 3/3472* (2013.01); *A23L 3/34635* (2013.01); *A23L 3/3571* (2013.01); *A23V 2002/00* (2013.01); *A23Y 2220/25* (2013.01); *A23Y 2280/15* (2013.01)

(58) Field of Classification Search
CPC .............................. A23B 4/22; A23L 3/34635
USPC ................................................ 426/641, 9, 56
See application file for complete search history.

(56) References Cited

U.S. PATENT DOCUMENTS

| | | | | |
|---|---|---|---|---|
| 5,364,645 A | * | 11/1994 | Lagunas-Solar ....... | A23B 7/015 426/248 |
| 2007/0104809 A1 | * | 5/2007 | Coyne .................... | A23L 3/3571 424/745 |

FOREIGN PATENT DOCUMENTS

| | | |
|---|---|---|
| CN | 102188034 A | 9/2011 |
| EP | 0 461 530 B1 | 12/1991 |
| EP | 0 640 291 B2 | 3/1995 |
| GB | 1 324 917 | 7/1973 |

OTHER PUBLICATIONS

Ennahar, S. et al. J. Biosci. Bioeng.87: 705-716 (1999) (Year: 1999).*
Todorov, S. D. et al. Enz. Microb. Technol. 36: 318-326 (2005) (Year: 2005).*
Cueva, C. et al. Lett. Appl. Microbiol. 54: 557-563 (2012) (Year: 2012).*
Budde et al., "*Leuconostoc carnosum* 4010 has the potential for use as a protective culture for vacuum-packed meats: culture isolation, bacteriocin identification, and meat application experiments", *International Journal of Food Microbiology*, vol. 83, pp. 171-184 (Jun. 2003).
BVL L 00.00-20, Microbiology of food and animal feeding stuffs—Horizontal method for the detection of *Salmonella* spp., DIN EN ISO 6579, (Oct. 2007).
Eijsink et al., "Comparative studies of class IIa bacteriocins of lactic acid bacteria", *Applied and Environmental Microbiology*, vol. 64, No. 9, pp. 3275-3281 (Sep. 1998).
Ennahar et al., "Class IIa bacteriocins: Biosynthesis, structure and activity", *FEMS Microbiology Reviews*, vol. 24, pp. 85-106 (2000).
Papagianni et al., "Determination of bacteriocin activity with bioassays carried out on solid and liquid substrates: assessing the factor indicator microorganism", *Microbial Cell Factories*, vol. 5, No. 30, 14 pp. (Oct. 2006).
Vermeiren et al., "Evaluation of meat born lactic acid bacteria as protective cultures for the biopreservation of cooked meat products", *International Journal of Food Microbiology*, vol. 96, pp. 149-164 (Mar. 2004).
Knoll et al., "Influence of Phenolic Compounds on Activity of Nisin and Pediocin PA-1," *American Journal of Enology and Viticulture*, vol. 49, No. 4, pp. 418-421 (Jan. 2008).
Mahady, et al., "Resveratrol from wine inhibits the growth of Helicobacter pylori in vitro," *Phytomedicine*, vol. 7(Suppl. II), p. 57, (Jan. 2000), [Abstract].
Birtić et al., "Carnosic acid," Phytochemistry 115 (2015) 9-19 (Available online Jan. 29, 2015).

* cited by examiner

*Primary Examiner* — Hamid R Badr
(74) *Attorney, Agent, or Firm* — Foley & Lardner LLP

(57) ABSTRACT

The present invention relates to a method of reducing the concentration of Gram-negative bacteria in a food product, the method comprising adding a red wine extract produced from red wine by dealcoholization, concentration and drying, and a culture comprising at least one class IIa bacteriocin-producing lactic acid bacterial strain to a food product, ripening the food product, and storing the food product at a temperature of at the most 15° C. until a concentration less than 1 E-1 of Gram-negative bacteria. In a preferred embodiment of the invention, Gram-negative bacteria already present are eliminated. In one embodiment of the invention, the Gram-negative bacteria are *Salmonella* ssp. The bacteriocin-producing culture may comprise at least one of *Lactobacillus curvatus* (DSM 18775) and *Pediococcus acidilactici* (DSM 28307). The invention further relates to a kit for reducing the concentration of Gram-negative bacteria in a food product comprising a red wine extract produced from red wine by dealcoholization, concentration and drying, and a culture comprising at least one class IIa bacteriocin-producing lactic acid bacterial strain.

20 Claims, 3 Drawing Sheets

Figure 1:
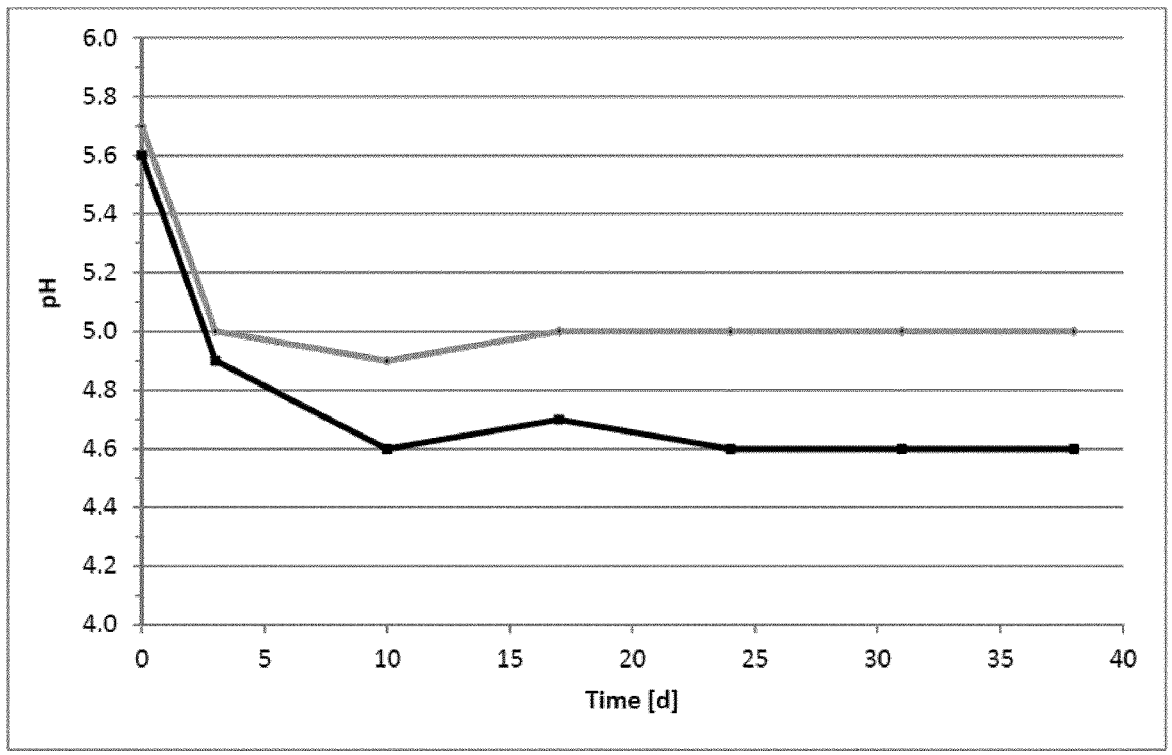

REDUCTION OF THE CONCENTRATION OF GRAM-NEGATIVE BACTERIA IN A FERMENTED FOOD PRODUCT BY THE COMBINATION OF RED WINE EXTRACT AND A CULTURE COMPRISING AT LEAST ONE BACTERIOCIN-PRODUCING LACTIC ACID BACTERIAL STRAIN

The present application is the U.S. National Stage of International Application No. PCT/EP2016/052899, filed Feb. 11, 2016, and claims priority to European Patent Application No. 15154620.7, filed Feb. 11, 2015.

FIELD OF THE INVENTION

Bacterial contamination of food products is known to be responsible for the transmission of food borne illness. This problem is particularly important in meat and dairy products which are not reheated by consumers prior to ingestion and which are stored for extended times in refrigerators at 2-10° C. Pathogenic Gram-negative bacteria such as *Salmonella* and *E. coli* are of particular concern in food products.

In particular *Salmonella* contamination is a serious problem in fermented, spreadable sausage like typical German Teewurst. The present invention is based upon the surprising finding by the present inventors in a *Salmonella* challenge test that the combination of red wine extract and a bacteriocin-producing culture is able to inhibit and even eliminate *Salmonella* already present to a level below the qualitative detection limit whereas the application of the bacteriocin-producing culture alone, without the red wine extract, did not lead to the same effect. Based upon this surprising finding it is contemplated that the combination of red wine extract with a culture comprising at least one bacteriocin-producing lactic acid bacterial strain will be useful also against other Gram-negative bacteria and in other fermented food products, e.g. fermented dairy products.

Accordingly, the present invention relates to the use of red wine extract produced from red wine by dealcoholization, concentration and drying, and a culture comprising at least one class IIa bacteriocin-producing lactic acid bacterial strain for reducing the concentration of Gram-negative bacteria in food products kept at a temperature of at the most 15° C.

BACKGROUND OF THE INVENTION

Teewurst is a traditional sausage in Germany, typically made from pork and beef, which is characterized by a soft and spreadable texture. Teewurst can be grouped together with products like "frische Mettwurst" which show a relatively high pH compared to other fermented sausages and which are less dried, showing a relatively high water content. The preparation and processing of this product does not include any heat treatment or the use of safety hurdles other than the use of salt, nitrate/nitrite salts and, as the case may be, smoking.

Due to the slow acidification, the high water activity and the lack of other putative hurdles, Teewurst is a product with a certain risk for microbiological contamination. Especially *Salmonella* is a serious problem for spreadable meat products like Teewurst as *Salmonella* is most efficiently inhibited by a fast drop in pH which is not wanted for spreadable sausages. Until now no efficient anti-*Salmonella* solution is commercially available for raw fermented food applications.

SUMMARY OF THE INVENTION

The present invention relates to a method of reducing the concentration of Gram-negative bacteria in a fermented food product, the method comprising adding a red wine extract produced from red wine by dealcoholization, concentration and drying, and a culture comprising at least one class IIa bacteriocin-producing lactic acid bacterial strain to a food product, ripening the food product, and storing the food product at a temperature of at the most 15° C. until a concentration of less than 1 E-1 of Gram-negative bacteria.

A solution for the reduction of Gram-negative bacteria such as *Salmonella* and *E. coli* is of great interest in fermented food products, in particular raw meat applications such as spreadable meat products like "Teewurst" and sliceable meat products such as sausages, e.g. salami.

DETAILED DISCLOSURE OF THE INVENTION

It is well-known to use lactic acid bacteria to induce fermentation of food products, typically raw salted meat products, for providing the desired change in the characteristics of the food matrix during fermentation (e.g. a desired acidification, and certain other sensory and technological parameters). During the fermentation process the lactic acid bacteria primarily produce lactic acid whereby pH drops to the desired pH-value depending on the strain(s) and the processing conditions (temperature, sugar type/content etc.), and importantly, the sensory properties of the product are distinctly changed.

The term "food product" as used herein refers to any food that is susceptible to bacterial growth and proliferation of pathogenic bacteria. Such food products include, but are not limited to, meat, dairy products, vegetables, fruits and grains.

As used herein, the term "meat" refers to any meat product or meat by-product (including those processed) from an animal which is consumed by humans or animals, including, without limitation, meat from bovine, ovine, porcine, poultry, fish and crustaceous seafood. Examples of fermented meat products are sausages e.g. spreadable and dried sausages, ham, and fermented fish.

The term "dairy product" is intended to include any food product made using milk or milk products, including, but not limited to, milk, yogurt, ice cream, cheese, butter, and cream.

As used herein, the term "fermentation" refers to the process of biochemical changes e.g. an acidification in animal and/or plant material (i.e. a food matrix), involving activity of live microbial cells under aerobic and/or anaerobic conditions to obtain a food product of desired quality.

The term "ripening" refers to the maturation, drying, flavor development, enzymatic activity like lipolysis or proteolysis leading to complex flavor development in particular for longer ripened products like salami.

Whereas the lactic acid bacteria are mainly responsible for the acid formation, *Micrococcaceae* spp. and *Staphylococcaceae* spp. which are often also added are responsible for enhancing the flavor formation by producing non-volatile and volatile compounds through various biochemical reaction steps. Additionally, the *Micrococcaceae* spp. and *Streptococcaceae* spp. are responsible for the speed and intensity of color formation in particular in fermented sausage types.

Lactic acid bacterial strain(s) added to food to inhibit pathogens and/or extend shelf life without changing the sensory properties of the product are termed "protective cultures". Protective cultures are not intended to change the sensory properties of the product. Their use or that of their metabolic products (organic acids, hydrogen peroxide, enzymes and bacteriocins) is often referred to as "biopreservation" or "bioprotection".

An important aspect in the evaluation of the use of a strain as a bioprotective culture is the ability of the strain to work in the food product for which it is intended. In this respect it is not only important that the strain is able to inhibit any undesired food-borne pathogenic bacteria in the product under relevant storage conditions, but also that it does not produce any undesired sensory effects (off-taste, off-odors or unwanted color changes).

In the present specification and claims, the term "red wine extract" refers to a powder produced from red wine essentially by dealcoholization, concentration, and drying. Optionally further steps are filtration and pasteurization. As known to the person of skill in the art dealcoholization can be achieved by separation techniques or a combination of techniques like partial vacuum evaporation, membrane techniques or distillation. The drying is preferably performed by spray drying which is a drying technique that uses hot air to transfer the heat and remove evaporated water by an apparatus which allows the formation of particles from dispersion. Alternative but more costly drying methods are vacuum drying and freeze drying. Pasteurization is a sterilization technique commonly used for different foods where the food source is heated to temperatures between 60° C.-90° C. for a very short time. The short time interval during which the food material is heated guarantees that only minor thermic changes take place in regard to flavor, texture etc.

At the end of the process a free flowing red wine powder is obtained which comprises all components commonly found in red wine except for water and alcohol.

A great number of Gram-positive and Gram-negative bacteria produce during their growth proteinaceous substances which possess antimicrobial activities. When being produced by Gram-positive bacteria these substances are called bacteriocins.

Due to their high importance in the food industry the lactic acid bacteria are the most intensively studied group of bacteriocin-producing Gram-positive bacteria. However, most of the bacteriocins produced by lactic acid bacteria are not active towards Gram-negative bacteria. This is also the case for the bacteriocins produced by the strains used in the culture in the examples of the present application. It is contemplated that the reason that the bacteriocins are not active towards Gram-negative bacteria is the additional layer that is surrounding the cell wall of Gram-negative bacteria, the outer membrane (OM). The most important role of this additional outer membrane layer is to serve as a selective permeation barrier to prevent the entry of bactericidal respectively toxic agents while at the same time allowing the influx of nutritional components. Due to its polyanionic character, the OM cannot be passed by most bactericidal agents like antibiotics, bacteriocins or lytic proteins (e.g. lysozyme).

However, there is growing evidence that numerous agents, most of them cationic, have notable OM-damaging activity. Some of these agents are only weakly bactericidal but are remarkably effective in permeabilizing the OM to other agents. These permeabilizers are useful tools in various cellular studies in which the impermeability of the OM is critical. Without being bound to this theory it is contemplated that the inhibitory activity of the combination of red wine extract produced from red wine by dealcoholization, concentration and drying, and a culture comprising at least one class IIa bacteriocin-producing lactic acid bacterial strain may be based on a mechanism where components of the red wine extract serve as OM-permeabilizing agents.

Based upon the above it is contemplated that the concentration of other Gram-negative bacteria such as *E. coli* may be reduced in a similar manner as demonstrated with regard to *Salmonella*.

The present invention provides a method for reducing the concentration of Gram-negative bacteria in a fermented food product. In the present context the term "reducing the concentration" relates to a reduction in the amount of pathogenic bacteria. A reduction may be provided by killing, inactivating or inhibiting the growth of the pathogenic bacteria. In one embodiment of the present invention the log loss of pathogenic bacteria during the storage is at least 1 after 3 weeks of storage at 15° C., preferably at least 2, more preferably at least 3, even more preferably at least 4, most preferably at least 5. As evident from the results in the present patent application the log loss may increase over time and the log loss is preferably at least 2, more preferably at least 3, even more preferably at least 4, most preferably at least 5 after 4 or 5 weeks of storage at 15° C. The log loss depends inter alia on the amount of pathogenic bacteria originally present in the product, the higher the amount the higher the potential log loss. As evident from FIG. 2, the reduction may lead to the amount being below the qualitative detection limit. In a preferred embodiment, Gram-negative bacteria already present are eliminated or reduced to an amount being below the qualitative detection limit.

A significant concern in the food processing industry is controlling the growth of food-borne Gram-negative bacteria capable of causing disease or illness in animals or humans either by themselves or by toxins that cause disease or illness. Examples of food-borne Gram-negative bacteria, the concentration of which is to be reduced by the method of the invention, are *Aeromonas caviae*; *Aeromonas hydrophila*; *Aeromonas sobria*; *Campylobacter jejuni*; *Citrobacter* ssp.; *Enterobacter* ssp.; *Escherichia coli* enteroinvasive strains; *Escherichia coli* enteropathogenic strains; *Escherichia coli* enterotoxigenic strains; *Escherichia coli* O157: H7; *Klebsiella* ssp.; *Plesiomonas shigelloides*; *Salmonella* ssp.; *Shigella* ssp.; *Vibrio cholerae*; *Yersinia enterocolitica*.

Preferably, the pathogenic bacteria to be reduced according to the present invention are *E. coli* and *Salmonella* spp.

The present invention is based on an experiment demonstrating reduction of the concentration of Gram-negative bacteria in a fermented food product by the combination of a red wine extract produced from red wine extract by dealcoholization, concentration and drying with a culture comprising at least one class IIa bacteriocin-producing lactic acid bacterial strain. The effect of the above mentioned combination has been demonstrated by preparing a standard meat mince of a "grobe Teewurst" by applying *Staphylococcus xylosus* (DSM 28308), *Lactobacillus curvatus* (DSM 18775) and *Pediococcus acidilactici* (DSM 28307). The meat mince was inoculated by three different *S. typhimurium* strains at appropriate facilities. To one batch of meat mince red wine extract was added whereas no red wine extract was added to the control batch. The prepared meat mince was filled into standard casings and ripened for three days, followed by a period of storage at a temperature of at the most 15° C. The temperature should be appropriate to ensure production of class IIa bacteriocin by the bacteriocin-producing strain or strains. In some embodiments, the temperature is in the range of 2 to 10° C. The food product may be packaged under vacuum or at modified atmosphere, if desired.

This storage period is often termed the "shelf life". As used herein the term "shelf life" means the period of time that a food product remains saleable to retail customers. In traditional meat processing, the shelf life of meat and meat by-products is about 30 to 40 days after an animal has been slaughtered. Refrigeration of meat during this period of time is expected to largely arrest and/or retard the growth of pathogenic bacteria, and to a lesser extent, spoilage bacteria. After about 30 to 40 days, however, refrigeration is no longer able to effectively control the proliferation of spoilage bacteria below acceptable levels.

The sausages were analyzed in regard to the cell count of *S. typhimurium*. As can be seen from FIG. 2, both lines pass the quantitative detection threshold, 1E+1 cfu/g, at day 10 and the black line passes the qualitative detection threshold <4E-2 cfu/g or negative in 25 g on day 24, the result being 3E-2 cfu/g. From day 24 until the end of shelf life *S. typhimurium* could not be detected anymore in sausages produced by the combination of red wine extract produced from red wine by dealcoholization, concentration and drying with a culture comprising at least one class IIa bacteriocin-producing strain, whereas *Salmonella* was still present in sausages produced with the culture with the at least one class IIa bacteriocin-producing strain only.

From these results it can be concluded that a reduction in the concentration and even elimination of Gram-negative bacteria *Salmonella* was achieved by combining the culture comprising at least one class IIa bacteriocin-producing strain with red wine extract produced from red wine by dealcoholization, concentration and drying. When the culture with at least one class IIa bacteriocin-producing strain was not combined with red wine extract produced from red wine by dealcoholization, concentration and drying no similar effect was achieved. As appears from the figure the addition of red wine extract leads to a further drop in pH of approximately 0.3-0.4 units. However, this does not have an adverse effect on the taste, rather on the contrary. Although the pH drop may contribute to the effect of the class IIa bacteriocin-producing culture on the Gram-negative bacteria it is by no means substantial enough to explain the effect of the red wine extract.

The effect of the described combination of red wine extract produced from red wine by dealcoholization, concentration and drying, and culture comprising at least one class IIa bacteriocin-producing strain is rather based on the disruption of the integrity of the outer membrane of the Gram-negative bacteria, such as *Salmonella*, by components of the red wine extract. The disturbance of the outer membrane integrity allows the antimicrobial peptides (bacteriocins) produced by the bacteriocin-producing strain(s) of the culture to enter their target.

By a "bacteriocin-producing lactic acid bacterial strain" is meant a strain producing a proteinaceous compound which shows a bactericidal effect towards other strains of the same or closely related species. The bacteriocin-producing strain is not itself inhibited by the bacteriocin it produces. The different bacteriocins produced by a wide variety of strains are rather heterogenous and are classified mostly based on their molecular weight. The inhibitory spectrum of the bacteriocin-producing culture respectively strain can be narrow but can also be relatively broad, meaning that the produced bacteriocin can be inhibiting also different bacterial species.

In the present invention the bacteriocin-producing strain produces a class IIa bacteriocin such as pediocin, bavaracin, sakacin, curvacin, leucosin, plantaricin. The bioprotective strains *Lactobacillus curvatus* and *Pediococcus acidilactici* tested herein are both producing a class IIa bacteriocin.

Whether a particular strain produces a sufficient amount of bacteriocin could be tested by a bacteriocin activity test. For a bacteriocin IIa activity the strain could be tested as outlined in example 2.

It is contemplated that in order to be a useful strain to be used in a culture comprising at least one class IIa bacteriocin-producing lactic acid bacterial strain according to the present invention, the cell free supernatant of the bacteriocin-producing strain should at least cause a 50% growth inhibition in regard to optical density OD600 of a suitable indicator strain with a dilution factor not less than 0.5 equal to 40 AU/ml.

In the culture used in the example of the present patent application, two class IIa bacteriocin-producing strains were present, the *Lactobacillus curvatus* strain deposited as DSM 18775 and the *Pediococcus acidilactici* strain deposited as DSM 28307. It is contemplated, however, that one class IIa bacteriocin-producing strain will be sufficient.

It is contemplated that any bacterial strain producing a class IIa bacteriocin will be able to reduce the concentration of Gram-negative bacteria such as *Salmonella* when combined with red wine extract. Examples of bacteria producing class IIa bacteriocins are *Carnobacterium maltaromaticum, Camobacterium pisicola, Camobacterium divergens, Lactobacillus curvatus, Lactobacillus sakei, Lactobacillus plantarum, Lactococcus lactis, Leuconostoc carnosum, Leuconostoc gelidium, Pediococcus acidilactici, Pediococcus pentosaceus*. Examples of such strains can be found in Eijsink et al., 1998, Ennahar et al., 2000, and Vermeiren et al., 2004.

Presently preferred strains are the *Lactobacillus curvatus* strain deposited as DSM 18775 and the *Pediococcus acidilactici* strain deposited as DSM 28307.

Within the scope of the present invention is a culture comprising at least two class IIa bacteriocin-producing strains. If more than one strain is used, the strains preferably produce different class IIa bacteriocin(s) and/or act on different targets. In a presently preferred embodiment, the culture comprises both the *Lactobacillus curvatus* strain deposited as DSM 18775 and the *Pediococcus acidilactici* strain deposited as DSM 28307. In a further embodiment, the culture may comprise at least three class IIa bacteriocin-producing strains. Preferably, one of them will be the *Lactobacillus curvatus* strain deposited as DSM 18775 and the *Pediococcus acidilactici* strain deposited as DSM 28307, or both. In a yet further embodiment, the culture comprises four or more class IIa bacteriocin-producing strains. Preferably, one of them will be the *Lactobacillus curvatus* strain deposited as DSM 18775 and the *Pediococcus acidilactici* strain deposited as DSM 28307, or both.

If desired, the culture may in addition to the at least one class IIa bacteriocin-producing lactic acid bacterial strain comprise at least one ripening strain which assists at the least one class IIa bacteriocin-producing lactic acid bacterial strain in the development of quality parameters such as acidification, reduction in water binding and water activity, general appearance, color, texture, odor, aroma, taste, flavor and other sensorial and technological parameters. Examples of such ripening strains are *Staphylococcus carnosus* and *Staphylococcus xylosus*, i.e. the *Staphylococcus xylosus* deposited as DSM 28308. For meat products with a short ripening the class IIa bacteriocin-producing lactic acid bacterial strain(s) only are contemplated to be sufficient to produce an appropriate fermented meat product as also class IIa bacteriocin-producing strains are contributing to taste.

However, if desired at least one *Staphylococcus* or *Micrococcaceae* strain could be added for taste and coloring reasons as these strains are able to reduce the nitrate to nitrite which is further reacting to NO which in the end reacts with the myoglobin in the meat to a stable red nitrosylmyoglobin.

The fermented food product is manufactured by providing a food matrix, adding a red wine extract produced from red wine by dealcoholization, concentration and drying, and a culture comprising at least one class IIa bacteriocin-producing lactic acid bacterial strain, ripening the product, optionally drying the food product, and storing the food product at a temperature of at the most 15° C. until a concentration of less than 1 E-1 of Gram-negative bacteria.

It is contemplated that the present invention will be useful for all fermented food products but particularly useful for meat products having an $a_w$ in the range of 0.92 to 0.96, such as in the range of 0.92 to 0.93, 0.93 to 0.94, 0.94 to 0.95 or 0.95 to 0.96.

Preferably, the food product has a salt content (w/w) in the range of 2.4% to 4.0%, such as 2.4% to 3.0%, 3.0% to 3.5%, or 3.5% to 4.0%, and a short ripening in the range of 2 to 16 days, such as 2 to 9 days, or 10 to 16 days. The pH is preferably in the range of 4.5 to 6.0. Examples of such products are spreadable products such as spreadable sausages which generally have a pH in the range of from 5.3 to 6.0, such as 5.3 to 5.7 or 5.8 to 6.0, and dried meat products such as sliceable sausages generally having a pH in the range of 4.5 to less than 5.3, such as 4.5 to 4.8 or 4.9 to less than 5.3. From a safety point of view, a low pH, a low $a_w$, and a high salt content is preferred but this is not always feasible in order to obtain the desired sensory effects of the product.

Spreadable sausages are made by grinding of fat tissue and the originating fat is encasing the meat particles. This is leading to spreadability which is most distinctive in case of finely grinded products. The sausage is ripened depending on the different sausage type, cured, slightly dried and not intended for long storage. Examples of spreadable sausage products are: Teewurst, Teewurst Rügenwalder Art, grosse Teewurst, Mettwurst, Streichmettwurst, Hofer Rindfleischwurst, Braunschweiger Mettwurst, Braunschweiger Pfeffersäckchen, Zwiebelmettwurst, Zwiebelwurst, Frische Mettwurst, Vesperwurst, Frühstückswurst, Schmierwurst and fette Mettwurst.

Dried sausages are essentially made in a similar manner but subjected to a longer ripening period of 10 to 16 days such that a lower pH of less than 5.3 is reached and more drying to an $a_w$ in the range of 0.92 to 0.94. Examples of sliceable sausage products are Salami, Katenrauchwurst, Mettwurst, Cervelatwurst, Luftgetrocknete Mettwurst, Plockwurst, Räucherenden, Kabanossi, Landjäger, Pepperoni and others.

As used herein, the expression "effective amount" refers to the amount of class IIa bacteriocin-producing lactic acid bacteria which give rise to an inhibition of the bacterial growth or a reduction of the number of pathogenic bacteria from the food product.

In most cases, the culture comprising at least one bacteriocin-producing lactic acid bacterial strain is added during the cutter process with spices prior to the addition of salt.

In a preferred embodiment of the present invention the culture is added in a concentration in the range of 1E+4-1E+10 cfu/g product, such as in the range of 1E+5-1E+9 cfu/g product, e.g. in the range of 1E+6-1E+8 cfu/g product. In a presently preferred embodiment of the invention the culture is added in a range of 1E+6 to 1E+8 cfu/g product such as 1E+7 cfu/g product. If the culture comprises more than one class IIa bacteriocin-producing strain, these numbers refer to each strain.

For practical purposes, the invention may be provided as a kit for reducing the concentration of Gram-negative bacteria in a food product comprising a red wine extract produced from red wine by dealcoholization, concentration and drying, and a culture comprising at least one class IIa bacteriocin-producing culture.

In specific embodiments, the culture comprising at least one class IIa bacteriocin-producing lactic acid bacterial strain is provided in a suitable package. Such packages may be e.g. a pouch, a tetra-pak, a can and any other suitable means described in the art for containing microbial species. Further, the culture comprising at least one class IIa bacteriocin-producing lactic acid bacterial strain may be provided in any suitable form e.g. in a frozen or freeze dried form. When present in a kit, the kit will also comprise red wine extract produced from red wine by dealcoholization, concentration and drying either as a separate package or in a mixture with the culture.

The kit may further comprise instructions as to how to use the kit for reducing the concentration of Gram-negative bacteria in a food product.

Throughout the description and claims the word "comprise" and variations of the word, such as "comprising", is not intended to exclude other technical features, additives, components, or steps. Additional objects, advantages and features of the invention will become apparent to those skilled in the art upon examination of the description or may be learned by practice of the invention. The following examples and drawings are provided by way of illustration, and are not intended to be limiting to the present invention.

LEGENDS TO FIGURES

FIG. 1: Development of pH during ripening (3 days) and storage under vacuum at 15° C. (35 days) until the end of shelf life (38 days). Grey line is "grobe Teewurst" prepared by applying *Staphylococcus xylosus* (DSM 28308), *Lactobacillus curvatus* (DSM 18775) and *Pediococcus acidilactici* (DSM 28307) and black line is "grobe Teewurst" prepared by the same culture to which 0.5% red wine extract has been added.

Figure 2:
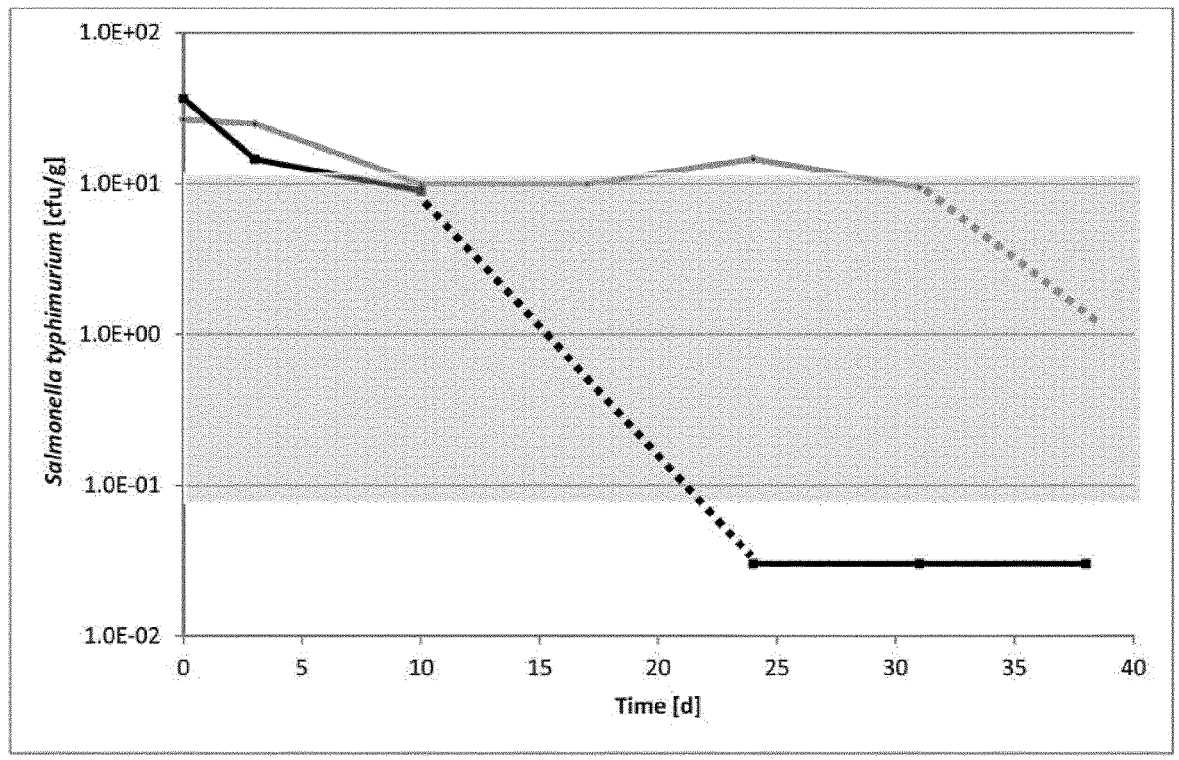

FIG. 2: Development of *Salmonella* cell count during ripening (3 days) and storage under vacuum at 15° C. (35 days) until the end of shelf life (38 days). Grey line is "grobe Teewurst" prepared by applying *Staphylococcus xylosus* (DSM 28308), *Lactobacillus curvatus* (DSM 18775) and *Pediococcus acidilactici* (DSM 28307) and black line is "grobe Teewurst" prepared by the same culture to which 0.5% red wine extract has been added.

Figure 3:
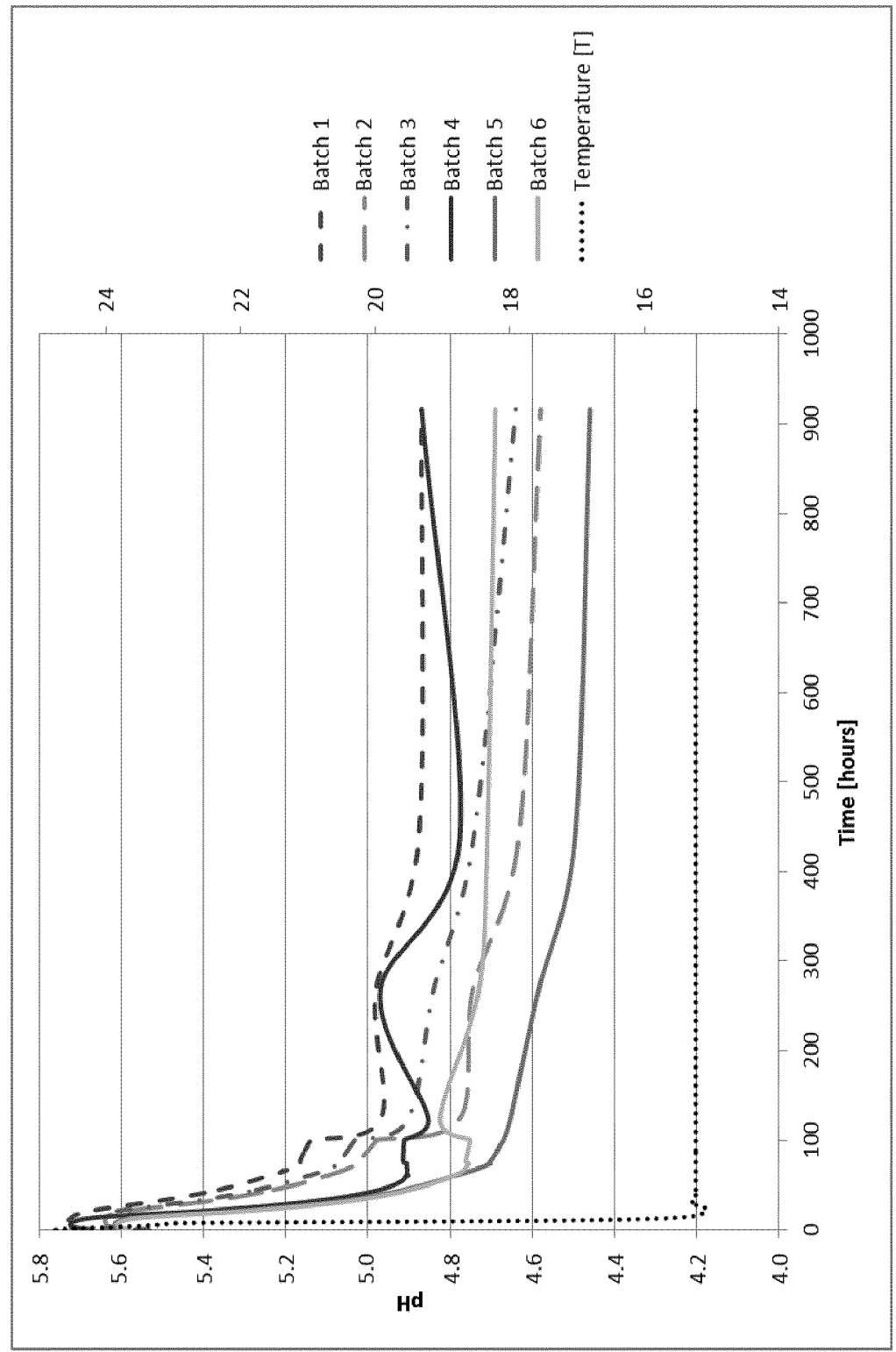

FIG. 3: Development of pH in the batches prepared as described in Example 3.

Figure 4:
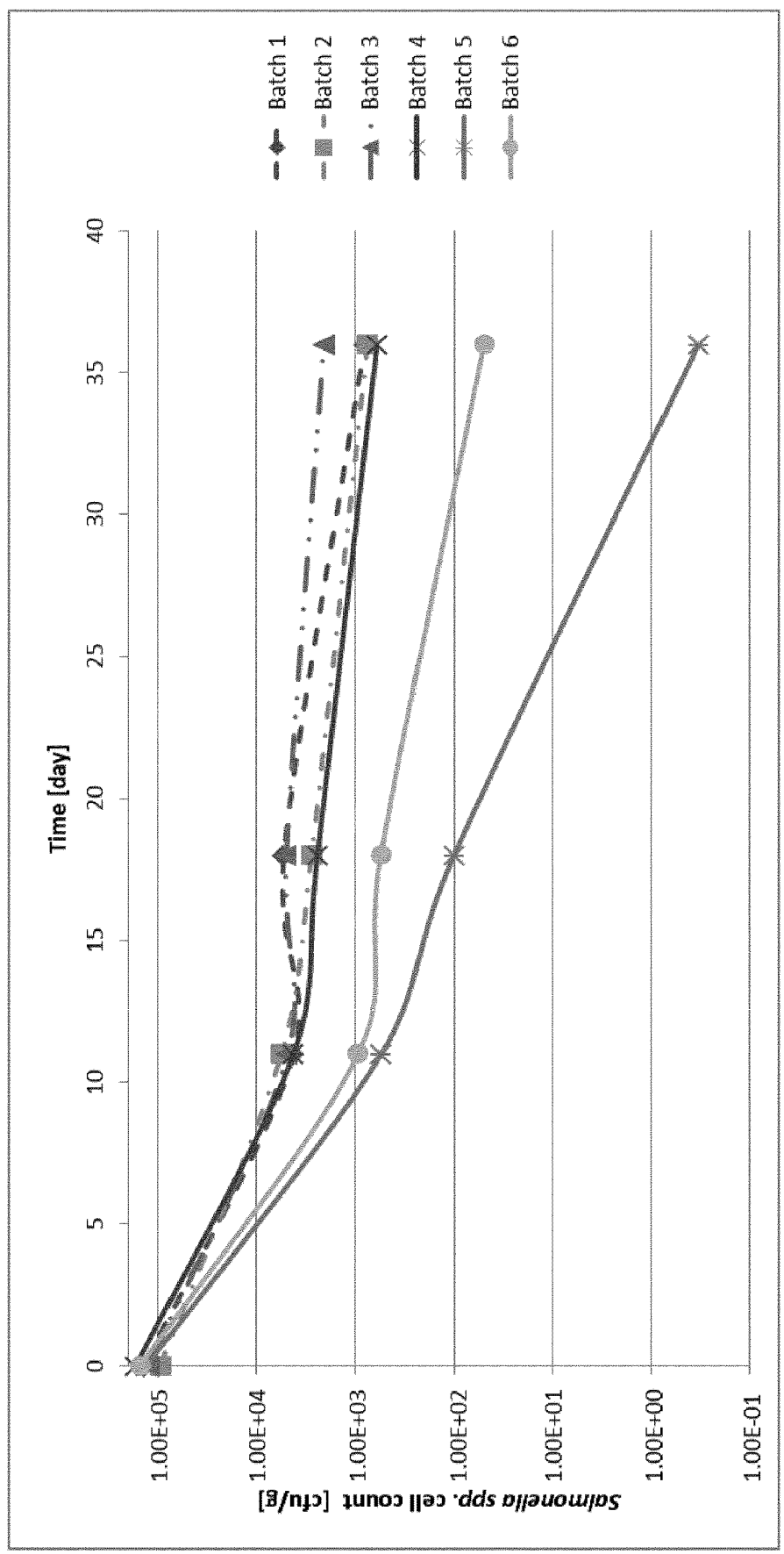

FIG. 4: Development of *Salmonella* spp. cell count for the batches prepared as described in Example 3.

DEPOSITED STRAINS

The *Lactobacillus curvatus* strain CHCC9720 has been deposited at DSMZ (Deutsche Sammlung von Mikroorganismen und Zellkulturen GmbH, Inhoffenstrasse 7B, D-38124 Braunschweig) under the accession number DSM 18775 with a deposit date of Nov. 9, 2006 by Chr. Hansen A/S, Denmark. The deposit has been made under the conditions of the Budapest Treaty on the International Recognition of the Deposit of Microorganisms for the Purposes of Patent Procedure.

The *Pediococcus acidilactici* CHCC4073 has been deposited at DSMZ (Deutsche Sammlung von Mikroorganismen und Zellkulturen GmbH, Inhoffenstrasse 7B, D-38124 Braunschweig) under the accession number DSM 28307 with a deposit date of Jan. 30, 2014 by Chr. Hansen A/S, Denmark. The deposit has been made under the conditions of the Budapest Treaty on the International Recognition of the Deposit of Microorganisms for the Purposes of Patent Procedure.

The *Staphylococcus xylosus* strain CHCC5680 has been deposited at DSMZ (Deutsche Sammlung von Mikroorganismen und Zellkulturen GmbH, Inhoffenstrasse 7B, D-38124 Braunschweig) under the accession number DSM 28308 with a deposit date of Jan. 30, 2014 by Chr. Hansen A/S, Denmark. The deposit has been made under the conditions of the Budapest Treaty on the International Recognition of the Deposit of Microorganisms for the Purposes of Patent Procedure.

For the above-identified deposited microorganisms, the following additional indications apply:

As regards the respective Patent Offices of the respective designated states, the applicants request that a sample of the deposited microorganisms stated above only be made available to an expert nominated by the requester until the date on which the patent is granted or the date on which the application has been refused or withdrawn or is deemed to be withdrawn.

Embodiments of the present invention are described below, by way of non-limiting examples.

EXAMPLES

Example 1: *Salmonella* Challenge Test

The effect of a combination of a bacteriocin-producing culture and red wine extract towards *Salmonella* was shown in a challenge test which was performed according to the following description at appropriate facilities.

Materials and Methods:

A standard meat mince for grobe Teewurst (see exemplarily shown standard recipe) was supplemented with *Staphylococcus xylosus* (DSM 28308), *Lactobacillus curvatus* (DSM 18775) and *Pediococcus acidilactici* (DSM 28307) with a cell count concentration in a range of 1.0E+6 cfu/g to 1.0E+7 cfu/g of meat for each strain.

TABLE 1

| Ingredient | Addition [%] | Total [kg] |
|---|---|---|
| Gammon piece or silverside of pork | 50 | 12,500 |
| Neck fat | 50 | 12,500 |
| Meat base | 100 | 25,000 |
| Dextrose | 0.35 | 0.088 |
| Pepper white | 0.20 | 0.050 |
| Paprika | 0.10 | 0.025 |
| Sodium ascorbate | 0.04 | 0.010 |
| Mace | 0.04 | 0.010 |
| Cardamom | 0.02 | 0.005 |
| Paprika extract | 0.01 | 0.003 |
| Nitrite curing salt (0.5%) | 2.40 | 0.600 |

The meat mince was subsequently inoculated by 5.0E+01 cfu/g of three different *S. enterica* subsp. *typhimurium* strains (DSM554), a wild isolate from raw fermented sausage and a wild isolate from fresh pork meat (strains TZL-038 and TZL-039 from the strain collection of TZL-MiTec GmbH) (Technologietransfer Zentrum Lippe). In addition to that the meat mince was supplemented with 24 g/kg of nitrite curing salt (NPS).

The prepared meat mince was divided into 2 batches. Into one of the batches 5 g/kg of red wine extract (697808 Red Wine Extract powder) commercially available from Chr. Hansen A/S was added. To the control batch no red wine extract was added. Both batches of meat mince were filled into standard casings with a diameter of 50 mm and a length of 230 mm with a target filling weight of approx. 285 g.

For ripening the prepared spreadable sausages were transported to the laboratory of meat technology of the "Hochschule Ostwestfalen-Lippe". The target weight for end of ripening was 250 g. The ripening was performed according to table 2.

TABLE 2

| Ripening program | | | | |
|---|---|---|---|---|
| Duration | Temperature | Humidity | Aeration | Weight loss |
| 24 h | 25° C. | 80% | Medium | 4-5% |
| 12 h | 22° C. | 80% | Medium | |
| 14 h | Smoke | 75% | Medium | 9-10% |
| 12 h | 18° C. | 75% | High | Target: 12% |

In the following the sausages were analyzed in regard to the cell count of *Salmonella* (day 0=raw material, day 3=end of ripening, day 10, day 17, day 24=mid of shelf life, day 31, day 38=end of shelf life) by the procedure described in BVL L 00.00-20 Salmonellen (Bundesamt für Verbraucherschutz and Lebensmittelsicherheit—Untersuchung von Lebensmitteln—Horizontales Verfahren zum Nachweis von *Salmonella* spp. in Lebensmitteln (Übernahme der gleichnamigen Norm DIN EN ISO 6579, Ausgabe Oktober 2007)).

Results:

pH:

The pH of the different batches was determined during the whole process at different time points (day 0, 3, 5, 10, 17, 24, 31 and 38). FIG. 1 shows the course of pH of both batches, the control batch where only the bacteriocin-producing culture was added and the sample batch where the red wine extract was added additionally.

Cell Count *Salmonella*:

FIG. 2 shows the development of the *Salmonella* cell count for both the control batch where only the bacteriocin-producing culture was added and the sample batch where the red wine extract was added additionally. As evident from the figure there is a clear reduction of the cell count of *Salmonella* when adding red wine extract in addition to the bacteriocin-producing culture compared to the control batch without the addition of red wine extract. From day 24 all samples (25 g) were negative for *Salmonella* when using the combination of bacteriocin-producing culture and red wine extract.

Conclusion:

FIG. 2 illustrates that from day 24 until the end of shelf life *S. typhimurium* could not be detected anymore in sausages produced by the combination of red wine extract with the culture comprising *Staphylococcus xylosus* (DSM 28308), *Lactobacillus curvatus* (DSM 18775) and *Pediococcus acidilactici* (DSM 28307) whereas *Salmonella* was still present in sausages produced with the culture only.

Example 2: Bacteriocin Activity Test

The aim of this test is to quantitatively determine the activity of group IIa bacteriocins produced by a culture comprising at least one bacteriocin-producing lactic acid bacterial strain by using a rapid microtiter assay which is a modification and combination of the assays described by Budde et al., 2003.

It is generally recognized that group IIa bacteriocins inhibit *Lactobacillus sakei* NCFB 2714, hence this strain is often used as indicator organism in assays for detection of class IIa bacteriocins. The present microtiter assay gives a quantitative measure of the bacteriocin activity of class IIa bacteriocins expressed as Arbitrary Units (AU/ml) based on the number of two-fold dilutions of a culture supernatant causing 50% growth inhibition of the indicator organism *Lactobacillus sakei* NCFB 2714.

The culture fermentate of a culture comprising at least one lactic acid bacterial strain putatively producing a bacteriocin is prepared by inoculating MRS broth with the bacteriocin-producing strain or culture to be tested to reach an $OD_{600}$ of 0.01-0.02 ($OD_{600}$ after subtraction of the blank value i.e. non inoculated MRS) which corresponds to a cell concentration of about 1E+07 cfu/ml. The culture is inoculated overnight (about 18 h) at 30° C. The cell suspension is centrifuged at 4500 g for 15 min at 5° C. The supernatant is removed and adjusted to pH 6.0±0.1 by using NaOH or 0.2N HCL followed by filter sterilization (0.2 μm).

The microtiter assay is prepared by first preparing the indicator solution strain by diluting 0.2 mL of the *Lactobacillus sakei* NCFB 2714 strain in 18 mL MRS broth. In each well 50 μl MRS-broth is added except for the first well of each row and the wells from the rows G and H and 50 μl of supernatant is added to the first and the second wells of the two first rows. From the well of the second row, 50 μl is transferred to the next well and this step is repeated. The content of each well has to be thoroughly mixed with the pipette before transferring liquid to the next well. Then 150 μl of the indicator strain is added to each well except row H (the blank). 10 μl of proteinase K is added in each well of row G. The microtiterplate is read in the microreader by measuring the $OD_{600}$ every 30 min during 20 hours at 30° C.

Calculation of Bacteriocin Activity

The $OD_{600}$ (0 h) is subtracted from The $OD_{600}$ (20 h). The activity of class IIa bacteriocins is reported in Arbitrary Units (AU/ml) defined as the reciprocal of the highest two-fold dilution showing 50% growth inhibition, calculated as 50% of the turbidity obtained for the indicator organism in the absence of bacteriocin solution.

Example 3: *Salmonella* Challenge Test in a Teewurst Meat Model System

The effect of a combination of two class IIa bacteriocin-producing cultures B-LC-20 (*Pediococcus acidilactici*) and F-LC (*Staphylococcus xylosus, Pediococcus acidilactici, and Lactobacillus curvatus*) and a red wine extract (RWE) towards *Salmonella* spp. in particular towards *S. enterica serovar Typhimurium* DSM11320 was tested in a challenge test performed in a meat model system based on a traditional "Teewurst" formulation. DSM11320 is a non-pathogenic *S. enterica* strain which is classified as risk class I according to TRBA 466 ("Technische Regeln für biologische Arbeitsstoffe"—"Einstufung von Prokaryonten (Bacteria and Archaea) in Risikogruppen"). The challenge test was performed according to the following description at appropriate facilities.

Materials and Methods:

A standard meat mince for "feine Teewurst" (see table 3) was produced according to the production process described (see table 4) and supplemented with dextrose (C*PharmDex 02010, Cargill Deutschland GmbH, Cerestarstrasse 2, D-47809 Krefeld) and RWE (697808 Red Wine Extract powder) and the cultures T-D-66 (*Lactobacillus plantarum, and Staphylococcus carnosus*) or B-LC-20 (*Pediococcus acidilactici*) and F-LC (*Staphylococcus xylosus, Pediococcus acidilactici, and Lactobacillus curvatus*) according to the batch description (see table 5). The applied cultures are commercially available from Chr. Hansen A/S and were dosed according to the standard recommendation of Chr. Hansen. The batches 1-6 were subsequently inoculated with *S. enterica serovar Typhimurium* DSM11320 with a target cell count of 1.0E+5 cfu/g of meat.

TABLE 3

Standard recipe for "Teewurst"

| Ingredient | | |
|---|---|---|
| Pork silverside (0° C.) | 6.0 kg | 60% |
| Pork back fat (0° C.) | 4.0 kg | 40% |
| Casings | — | — |
| Nitrite Salt (0.5%) | 26 g/kg | 2.6% |
| Dextrose | According to batch description | |
| White pepper | 2 g/kg | 0.2% |
| Paprika powder sweet | 2 g/kg | 0.2% |
| Sodium ascorbate | 0.5 g/kg | 0.05% |
| Mace | 0.5 g/kg | 0.05% |
| Cardamom | 0.2 g/kg | 0.02% |
| Total | 10 kg | 100% |

TABLE 4

Meat preparation and production process

| Raw material preparation | PI and PVII mincing to 3 mm hole plate<br>Store in chiller (0° C.) till production |
|---|---|
| Chopping and filling process | Addition of meat and fat<br>Addition of spices, starter culture- and protective culture at 1000 U/min<br>After 10 rounds addition of nitrite salt<br>Chopping at 4000 U/min till 9° C.<br>Stuffing in 200 g beaker |

TABLE 5

Batch description

| Batch number | Description | RWE (5 g/kg) | Dextrose (4 g/kg) | Dextrose (1 g/kg) |
|---|---|---|---|---|
| 1 | T-D-66 + DSM11320 | | X | |
| 2 | T-D-66 + DSM11320 | X | X | |
| 3 | T-D-66 + DSM11320 | X | | X |
| 4 | B-LC-20 + F-LC + DSM11320 | | X | |
| 5 | B-LC-20 + F-LC + DSM11320 | X | X | |
| 6 | B-LC-20 + F-LC + DSM11320 | X | | X |

The prepared beakers were fermented and ripened according to the temperature profile shown in FIG. 3 mimicking a standard process for the production of "Teewurst". The meat model system was not subjected to a drying procedure.

Results:

pH:

The development of pH is shown in FIG. 3. The pH of the different batches was determined during the first 100 hours of the process by continuous measurement. In the following the pH was only measured after 124 h, 268 h, 436 h and 916 h in 3 beakers per batch by 3 individual measurements for each.

Cell Count of *Salmonella* spp.:

FIG. 4 shows the development of the *Salmonella* spp. cell count for the relevant batches. As evident from the figure there is a clear reduction of the cell count of *Salmonella* spp. when adding red wine extract (RWE) in addition to the class IIa bacteriocin-producing cultures B-LC-20 (*Pediococcus acidilactici*) and F-LC (*Staphylococcus xylosus, Pediococcus acidilactici*, and *Lactobacillus curvatus*) (batch 5 and 6) compared to the control batch 4 where only the class IIa bacteriocin-producing cultures and no RWE was added. The most significant reduction of *Salmonella* spp. can be seen for batch 5. It is also evident from FIG. 4 that the combination of a standard non-bacteriocin producing culture (T-D-66) with the RWE is not leading to a significant reduction in cell count of *Salmonella* spp. and that no difference can be observed in comparison to control batch 1 were no RWE was added but only the non-bacteriocin producing culture.

Conclusion:

The results of above described experiment confirm previous findings that the combination of a class IIa bacteriocin-producing culture and a RWE is able to reduce *Salmonella* spp. significantly. As evident from FIG. 4 the application of any single component of the concept neither the RWE alone respectively in combination with a standard non-bacteriocin producing culture (batch 2 and 3) nor the class IIa bacteriocin-producing cultures without the addition of the RWE (batch 4) leads to a similar reduction of DSM11320. It is also evident that the addition of RWE to a standard non-bacteriocin producing culture (batch 2 and 3) is not having any added value in regard to the reduction of *Salmonella* compared to control batch 1 where only the non-bacteriocin producing culture is added.

However, it is also evident that the more significant pH drop by the addition of RWE is having an influence on the reduction of *Salmonella* spp. but it can be clearly seen by comparing batch 6 and batch 2/3 which show a similar final pH, that the pH drop alone cannot explain the more pronounced reduction of *Salmonella* in batch 6. From this comparison it is clearly evident that only the combination of a class IIa bacteriocin producing culture with the RWE is leading to a significant reduction of *Salmonella* spp. in the "Teewurst" model system.

REFERENCES

Budde et al., "*Leuconostoc carnosum* 4010 *has the potential for use as a protective culture for vacuum-packed meats: culture isolation, bacteriocin identification, and meat application experiments*", International Journal of Food Microbiology, Vol. 83, Issue 2, 15 Jun. 2003, 171-184

BVL L 00.00-20 Salmonellen (Bundesamt für Verbraucherschutz and Lebensmittelsicherheit—Untersuchung von Lebensmitteln—Horizontales Verfahren zum Nachweis von *Salmonella* spp. in Lebensmitteln (Übernahme der gleichnamigen Norm DIN EN ISO 6579, Ausgabe Oktober 2007))

Eijsink et al., "*Comparative studies of class IIa bacteriocins of lactic acid bacteria*", Applied and Environmental Microbiology, 1998, 3275-3281

Ennahar et al., "*Class IIa bacteriocins: Biosynthesis, structure and activity*", FEMS Microbiology Reviews, 24, 2000, 85-106

Papagianni et al., "*Determination of bacteriocin activity with bioassays carried out on solid and liquid substrates: assessing the factor "indicator microorganism"*, Microbial Cell Factories, 2006, 5:30

Vermeiren et al., "*Evaluation of meat born lactic acid bacteria as protective cultures for the biopreservation of cooked meat products*", International Journal of Food Microbiology, 96, 2004, 149-164

The invention claimed is:

1. A method of reducing the concentration of Gram-negative bacteria in a food product, comprising:
   adding to a food product a red wine extract produced from red wine by dealcoholization, concentration and drying, and a culture comprising at least one class IIa bacteriocin-producing lactic acid bacterial strain,
   ripening the food product, and
   storing the food product at a temperature of at most 15° C. until a concentration of Gram-negative bacteria of less than 1 CFU per 10 g food product is reached,
   wherein the Gram-negative bacteria are selected from *Aeromonas caviae*; *Aeromonas hydrophila*; *Aeromonas sobria*; *Campylobacter jejuni*; *Citrobacter* ssp.; *Enterobacter* ssp.; *Escherichia coli* enteroinvasive strains; *Escherichia coli* enteropathogenic strains; *Escherichia coli* enterotoxigenic strains; *Escherichia coli* O157:H7; *Klebsiella* ssp.; *Plesiomonas shigelloides*; *Salmonella* ssp.; *Shigella* ssp.; *Vibrio cholerae*; and *Yersinia enterocolitica*,
   wherein the method reduces the concentration of the Gram-negative bacteria in the food product to a greater extent than adding the class IIa bacteriocin-producing lactic acid bacterial culture and not the red wine extract.

2. A method according to claim 1, wherein the method reduces the presence of Gram-negative bacteria present in the food product at the start of the method.

3. A method according to claim 1, wherein the Gram-negative bacteria are selected from *Escherichia coli* enteroinvasive strains; *Escherichia coli* enteropathogenic strains; *Escherichia coli* enterotoxigenic strains; and *Escherichia coli* O157:H7.

4. A method according to claim 1, wherein the Gram-negative bacteria are *Salmonella* ssp.

5. A method according to claim 1, wherein the culture comprises at least one class IIa bacteriocin-producing strain selected from *Carnobacterium maltaromaticum, Carnobacterium pisicola, Carnobacterium divergens, Lactobacillus curvatus, Lactobacillus plantarum, Lactobacillus sakei, Lactococcus lactis, Leuconostoc carnosum, Leuconostoc gelidium, Pediococcus acidilactici, Pediococcus pentosaceus*.

6. A method according to claim 1, wherein the culture comprises at least one of *Lactobacillus curvatus* (DSM 18775) and *Pediococcus acidilactici* (DSM 28307).

7. A method according to claim 1, wherein the fermented food product is a dairy product, a meat product, a vegetable product, a fruit or a grain.

8. A method according to claim 7, wherein the fermented food product is a spreadable sausage.

9. A method according to claim 7, wherein the fermented food product is a sliceable sausage.

10. A fermented food product obtained by a method of claim 1.

11. A fermented food product obtained by a method of claim 2.

12. The fermented food product of claim 11, wherein the product is a dairy product, a meat product, a vegetable product, a fruit or a grain.

13. The fermented food product of claim 11, wherein the product is a spreadable sausage.

14. The fermented food product of claim 11, wherein the product is a sliceable sausage.

15. A method according to claim 2, wherein the Gram-negative bacteria are selected from *Escherichia coli* enteroinvasive strains; *Escherichia coli* enteropathogenic strains; *Escherichia coli* enterotoxigenic strains; and *Escherichia coli* O157:H7.

16. A method according to claim 2, wherein the Gram-negative bacteria are *Salmonella* ssp.

17. A method according to claim 2, wherein the culture comprises at least one class IIa bacteriocin-producing strain selected from *Carnobacterium maltaromaticum, Carnobacterium pisicola, Carnobacterium divergens, Lactobacillus curvatus, Lactobacillus plantarum, Lactobacillus sakei, Lactococcus lactis, Leuconostoc carnosum, Leuconostoc gelidium, Pediococcus acidilactici, Pediococcus pentosaceus*.

18. A method according to claim 2, wherein the culture comprises at least one of *Lactobacillus curvatus* (DSM 18775) and *Pediococcus acidilactici* (DSM 28307).

19. A method according to claim 2, wherein the fermented food product is a dairy product, a meat product, a vegetable product, a fruit or a grain.

20. A kit for reducing the concentration of Gram-negative bacteria in a food product, comprising:
 a red wine extract produced from red wine by dealcoholization, concentration and drying, and
 a culture comprising at least one class IIa bacteriocin-producing lactic acid bacterial strain,
 wherein the combination of the red wine extract and the culture inhibits growth of Gram-negative bacteria selected from *Aeromonas caviae; Aeromonas hydrophila; Aeromonas sobria; Campylobacter jejuni; Citrobacter* ssp.; *Enterobacter* ssp.; *Escherichia coli* enteroinvasive strains; *Escherichia coli* enteropathogenic strains; *Escherichia coli* enterotoxigenic strains; *Escherichia coli* O157:H7; *Klebsiella* ssp.; *Plesiomonas shigelloides; Salmonella* ssp.; *Shigella* ssp.; *Vibrio cholerae*; and *Yersinia enterocolitica* to a greater extent than the culture alone.

* * * * *